July 4, 1939.  H. L. SARGENT  2,164,352
CONTROL SYSTEM
Filed Nov. 10, 1934  6 Sheets-Sheet 1

Fig. 1.

INVENTOR
Herbert L. Sargent
BY
ATTORNEYS

July 4, 1939.  H. L. SARGENT  2,164,352
CONTROL SYSTEM
Filed Nov. 10, 1934    6 Sheets-Sheet 2

INVENTOR
Herbert L. Sargent
BY
ATTORNEYS

July 4, 1939.  H. L. SARGENT  2,164,352
CONTROL SYSTEM
Filed Nov. 10, 1934   6 Sheets-Sheet 3

INVENTOR
Herbert L. Sargent
BY
Chindahl, Parker & Coolson
ATTORNEYS

July 4, 1939.  H. L. SARGENT  2,164,352
CONTROL SYSTEM
Filed Nov. 10, 1934  6 Sheets-Sheet 5

Fig. 9.

INVENTOR
Herbert L. Sargent
BY
ATTORNEYS

July 4, 1939.  H. L. SARGENT  2,164,352

CONTROL SYSTEM

Filed Nov. 10, 1934  6 Sheets-Sheet 6

INVENTOR
Herbert L. Sargent
BY
ATTORNEYS

Patented July 4, 1939

2,164,352

UNITED STATES PATENT OFFICE 2,164,352

CONTROL SYSTEM

Herbert L. Sargent, North Danville, N. H.

Application November 10, 1934, Serial No. 752,495

29 Claims. (Cl. 236—9)

This invention relates generally to controls for regulating the operation of energy transferring systems to maintain a predetermined condition such as temperature, pressure, humidity, flow, speed, etc. and has more particular reference to controls of the so-called "on and off" type, that is, those in which the regulating device has only a definite number of positions, usually two.

In systems of the above character, the transfer of energy between the condition changing apparatus and the space or body being conditioned is usually controlled by a regulating device such as a valve, damper, switch, or the like, movable between condition-increasing and condition-decreasing positions under the control of a primary controller responsive to condition changes at a selected point of control in the space or body. With such a control, there is usually a substantial delay between the time that the position of the regulating device is changed in response to the control instrument and the time that the resulting change in the energy transfer becomes effective in the body. Because this inherent time lag varies so widely in different systems and with ever changing operating conditions, the maintenance of condition being controlled with the accuracy desired is seldom achieved even with conditioning systems carefully designed for a given space.

The general object of the invention is to overcome the detrimental efforts of the lag inherent in energy transferring apparatus and maintain substantially closer control of the condition being regulated than has been possible with the controls heretofore used.

As applied to the control of a heating system, the invention aims to provide a novel method for causing movement of the regulating device of a heating system between its "on and off" positions in cycles of a character such that the amount of heat added to the space being heated in a given period approximately equals the heat loss, and the amount is varied automatically to compensate for changes in the rate of heat loss from the space.

A more detailed object is to provide a novel method and apparatus for condition control wherein movement of a regulating device to one condition-changing position is initiated in response to a deviation in the space condition from the desired value, and the length of the ensuing condition-changing cycle is dependent on and timed in accordance with the delay in the resulting change of energy transfer between said apparatus and said space.

Another object is to provide a novel system of cyclic control for a heating system wherein the average temperature of the heat-transferring mechanism is varied approximately in accordance with changes in the rate of heat loss and the length of each heat supplying cycle is generally determined by the temperature of the heating mechanism prevailing at the start of the cycle.

Still another object is to provide a control of the above character having novel means for building up the temperature of the heating mechanism in the successive cycles executed during the continuance of the space below the desired temperature.

A further object is to provide a thermostatic control of the above character having novel means for delaying the starting of one heat-supplying cycle until the heat supplied during the preceding cycle has become effective at the room thermostat.

The invention also resides in the novel manner of initiating the operation of the timing means by which the lengths of the energy transferring cycles are terminated.

Still another object is to provide a cyclic control which is effectual only when the room temperature is at or near the desired value, the control being ineffectual when lower temperatures prevail due to a forced period of inactivity of the heater.

Other objects and advantages of the invention will become apparent from the following detailed description taken in connection with the accompanying drawings, in which.

While I have illustrated in the drawings and will herein describe my improved control as applied to several different heating systems which are typical of the many condition changing systems of the "on and off" type to which the invention is especially applicable, it is to be understood that I do not intend to limit the invention by such disclosure but aim to cover all modifications, alternative constructions and methods falling within the spirit and scope of the invention as expressed in the appended claims.

In general, the invention contemplates controlling the position of a regulating device which is movable between condition-increasing and condition-decreasing positions to control the supply of energy such as a condition changing medium to or from an apparatus by which energy is transferred to or from the body being conditioned. The general method involves moving the regulating device to one of its positions when the condition of the controlled body at a selected point of control deviates in one direction from the value desired to be maintained, detecting the resulting change in the condition of the transfer apparatus or the amount of energy stored therein irrespective of the value thereof, and in response to the detection of such change causing movement of the regulating device to its other position before the change in the rate of energy transfer between the apparatus and the body has become effective at the point of control.

As applied to systems of the character shown, the present method of control involves initiating effective operation of a heater or heat-supplying mechanism when the temperature in the space to be heated falls below that desired to be maintained, detecting the resulting increase in the rate of heat transfer to the space as evidenced, for example, by a rise in temperature at a predetermined point of control preferably at or near the point at which heat is imparted to the space, interrupting or reducing the supply of heat independently of the space temperature after the lapse of an interval timed with respect to the detection of such increased rate of heat transfer, and again initiating the operation of the mechanism after a time interval if the deviation in the space temperature continues below the desired value. By thus timing the heat-supplying cycles with respect to increases in the rate of delivery of heat, the various factors tending to produce overrun and under-run of the space temperature are effectually compensated for as will appear later. Also with such a control, the temperature of the heating mechanism and the lengths of the heat-supplying cycles will be adjusted automatically in accordance with changes in the heat loss from the space and correction will be made automatically for changes in the latter.

Figure 1:
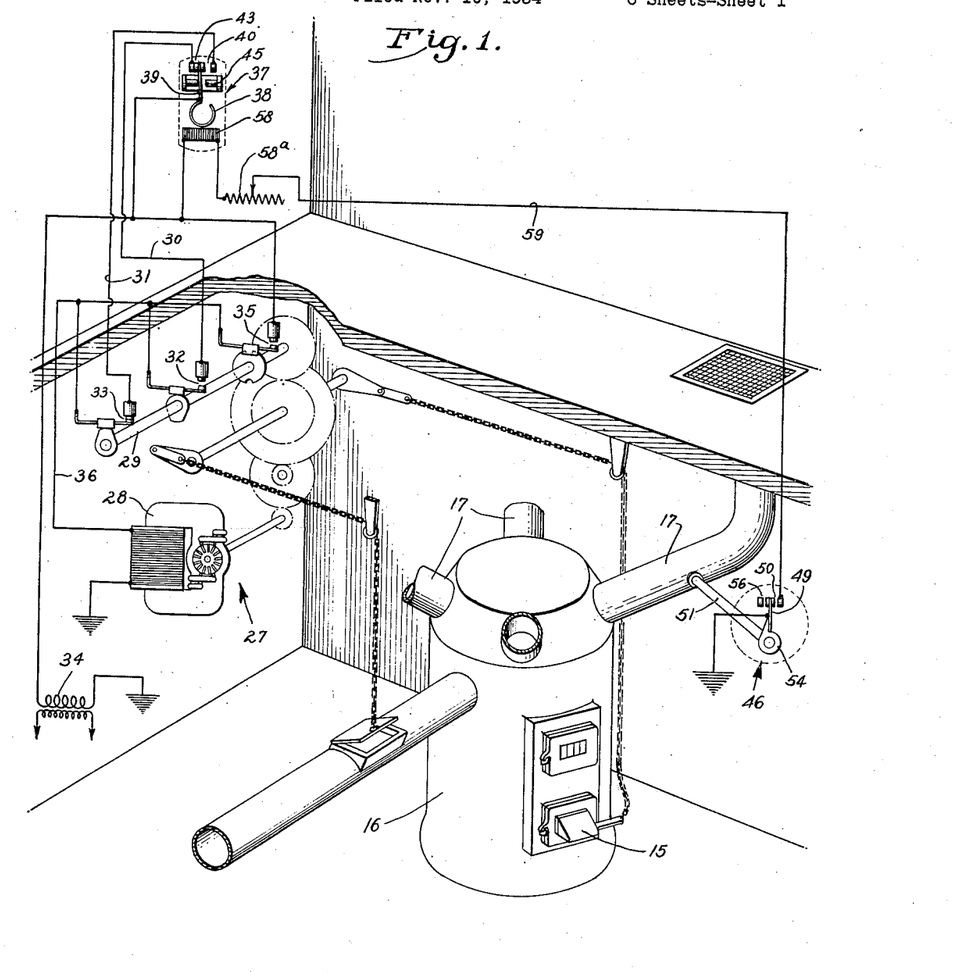
Figure 1 shows a section of a building equipped with a hot air heating system arranged to be controlled in accordance with the present invention, the parts of the system being shown schematically.
Figure 2:
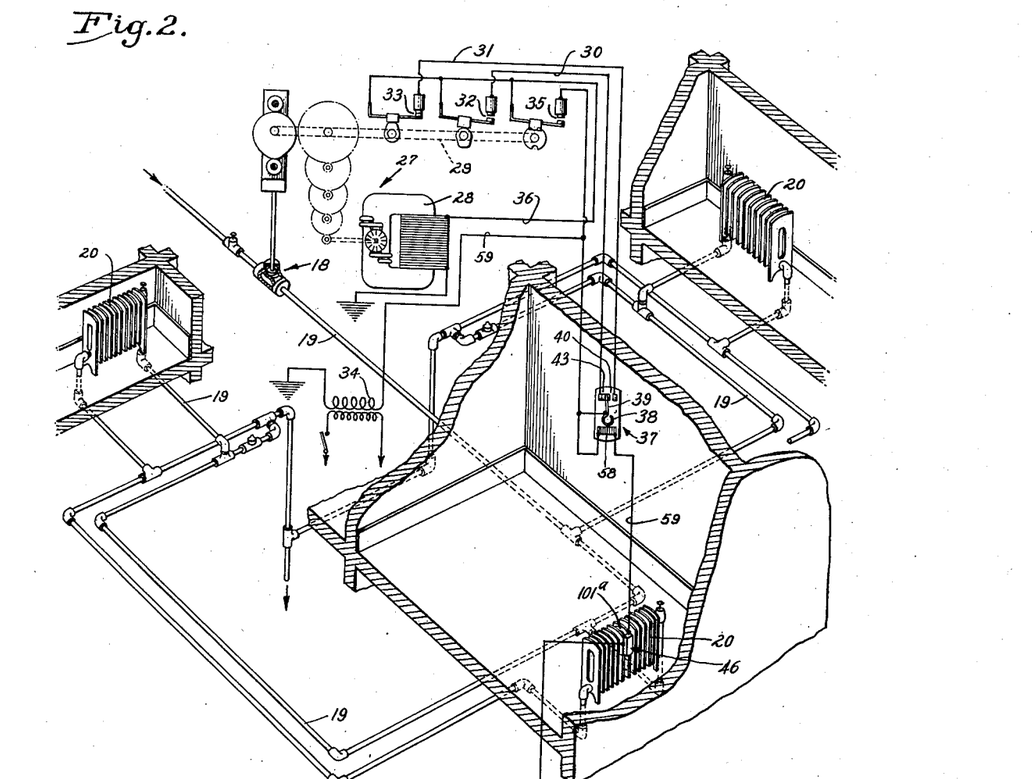
Fig. 2 is a similar view showing the control applied to a steam heating system in a zone or section of a building.

The present control is especially adapted for systems such as those shown wherein there is a substantial delay between the time when the controlling thermostat calls or ceases to call for heat and the time when the supply of heat to the space being heated is actually increased or decreased. In such systems, the supply of heat is governed by changing the position of a regulating device which, in the system shown in Fig. 1, is a draft damper 15 movable between a closed or heat-decreasing position and an open or heat-increasing position to vary the intensity of the fire in the hot air furnace 16 from which heated air is conveyed through pipes 17 to the rooms to be heated. As illustrated in Fig. 2, the regulating device may take the form of a valve 18 which, when in open position, permits the flow of heating fluid such as steam from a source (not shown) through conduits 19 to one or more radiators 20 located in different parts of a zone or section of the building. The supply of heating fluid is interrupted as an incident to closing of the valve. The supply of heat may also be controlled by starting and stopping an oil burner 21 (Fig. 3) arranged to heat fluid in a boiler 22 from which the fluid is conveyed by piping 23 to radiators 24 in different parts of the building. In this case, the regulating device is a switch controlling the burner motor and arranged to be closed upon energization of a magnet 26 and to be opened when the magnet is deenergized.

The damper 15 and the valve 18 may be actuated by a power operator 27 having an electric motor 28 arranged to drive a shaft 29 through cycles of fixed length during which the regulating device is opened and closed alternately. The opening and closing cycles, each of which comprises a half-revolution of the shaft 29, are initiated by closure of starting circuits 30 and 31 for the motor extending through cam operated switches 32 and 33 and common to a source 34 of alternating current. Each cycle of the operator is terminated by opening of a switch 35 in a maintaining circuit 36.

To detect a fall in room temperature below that desired to be maintained and thereby initiate movement of the regulating device to heat-increasing position, a thermostat 37 may be employed located at a proper representative point in the space to be heated and preferably having a thermostatic element 38 directly exposed to the air. A tongue 39 carried by the element 38 cooperates with a stationary contact to form a switch 40 which is closed when the air temperature falls below that desired to be maintained as determined by the setting of the thermostat. In the case of a system heated by an oil burner, the thermostat switch 40 is arranged in the circuit 41 of the winding 42 of the magnet 26, while for systems of the types shown in Figs. 1 and 2, the switch 40 is in the circuit 31, closure of which initiates movement of the regulating device to open position. The circuit 30 for closing the regulating device is controlled by a switch 43 which is closed by the element 38 in response to a rise of the element temperature to a value determined by the thermostat setting and slightly higher than that at which the switch 40 is closed.

If desired, a magnetic detent 45 may be associated with the magnetic tongue 39 of the thermostat so that movement of the later will occur with a snap action and frequent cycling of the heating mechanism due to jarring of the thermostat will be avoided. Such a detent is especially desirable where an oil burner is used as the primary source of heat.

As above set forth, the invention contemplates a timing of the heat-supplying cycles with reference to the time when additional heat becomes available for transfer or actually begins to be transferred to the space being heated following movement of the regulating device to heat-increasing position in response to the call of the room thermostat for heat. While the cycles of the heater may be timed with respect to a resultant temperature rise at various points of control, the temperature of which is proportional to the rate of delivery of heat to the space to be heated, the cycles are preferably terminated in timed relation to a temperature rise at or near the point of delivery of heat to the space being heated. The detection of this condition is effected in the present instance by an auxiliary thermostat 46 arranged to indicate automatically alternate increases or decreases of predetermined magnitude in temperature irrespective of the value of such temperature.

The thermostat 46 (Figs. 6, 7, 10, 13 and 14) preferably is of the electric switch type and comprises generally a sensitive element 47 operating through the medium of a device 48 to move a control member 49 through a predetermined range of movement in continuous response to a temperature change of the element. While the device 48 may take different forms, it is shown herein as comprising a slip clutch in the form of a friction coupling. The member 49 controls a switch 50 which is opened and closed in the movement of the member in opposite directions.

For some systems, such as that shown in Fig. 1, the thermostat 46 is of the insertion type with the element 47 in the form of a helix having one end stationarily supported and encased by a protecting tube 51 where necessary. The other end of the element fast on a shaft 52 which carries a disk 53 urged into frictional engagement with which a driven disk 54 is urged by a spring 55 to form the coupling 48. The control member 49 is an arm rigid with the disk 54 and at its free end carries a contact movable between two stationary stops 56 and 57, the latter of which cooperates with the arm to form the switch 50. The parts are so adjusted that sufficient friction is developed in the coupling 48 to turn the contact member 49 as long as the latter is free and unobstructed but to cause slippage between the coupling elements after the member 49 engages either of the fixed abutments while heating or cooling.

It will be observed that as the temperature of the element 47 rises after a previous fall in temperature, the arm 49 will be moved against the contact 57 closing the switch 50 which remains closed in the subsequent movement of the disk 53 as the temperature continues to rise. Upon a subsequent fall of sufficient magnitude in the temperature of the element, the arm 49 will move reversely against the stop 56 opening the switch 50 as it leaves the contact 57. The thermostat thus responds to alternate changes in temperature rather than variations relative to a particular value as in the case of the thermostat 37.

Figure 13:
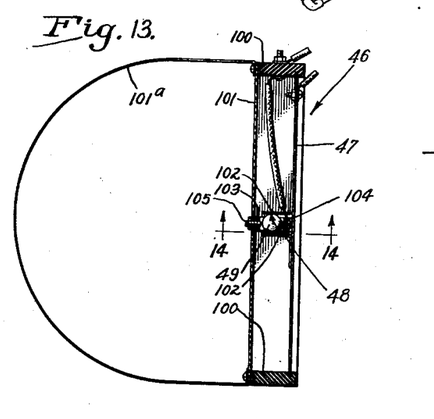
Fig. 13 is a cross-sectional view of a modified form of auxiliary thermostat.
Figure 14:
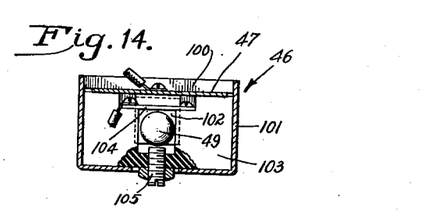
Fig. 14 is a section taken along the line 14—14 of Fig. 13.

In some systems, especially those using heating radiators, it is preferred that the thermostat 46 be of the surface type in order to give a more accurate indication of an actual increase in the rate of heat delivery to the surrounding air. Such a thermostat is shown in Figs. 2, 13 and 14 wherein the thermostatic element 47 comprises a plate of bimetallic material supported from its opposite ends by blocks 100 of insulation. These in turn are fixed to a casing 101 closed by the thermostatic element and adapted to be secured in contact with the outer radiator surface by a strap 101ᵃ. Spaced horizontal springs 102 are mounted on the element 47 to frictionally engage opposite sides of a ball which constitutes the control element 49 and is held in place by a block 103 of insulation supported by the housing 101. To form the switch 50, the ball cooperates with the springs 102 and a contact plate 104 on the block 103. Movement in the opposite direction is limited by an adjustable stop 105. It will be seen that upon heating of the element 47, the ball will be moved against the contact 104 while upon a subsequent cooling, the ball will move against the stop 105 before slippage occurs.

In the form of the thermostat shown in Figs. 3, 10, 11 and 12, the control arm 49 is bent around a shaft 121 and maintained in frictional engagement therewith by a spring strap 122 also engaging the shaft. As the shaft 121 is oscillated back and forth by changes in the temperature within the radiator, the arm 49 is moved back and forth between the contacts 56 and 57.

The temperature change to which the thermostat 46 must be subjected in order to move the driven friction element throughout its range of movement and thus effect closure of the control switch will vary considerably in order to obtain best results with different heating systems. As a general rule, with systems wherein the lag is large, a thermostat with a small differential will give best results. In any case, it is not important that the differential be very small. If the differential is too large, there is a tendency to produce an overrun of the room temperature. For systems of the types disclosed, the control will operate properly when the thermostat 46 is constructed so that the driven friction element will move throughout its range with a change of four or five degrees Fahrenheit. However, for some heating systems, a somewhat higher differential, for example, ten degrees, might be desirable, and a larger differential than this might not be objectionable.

Figures 4, 5, 6, 7:
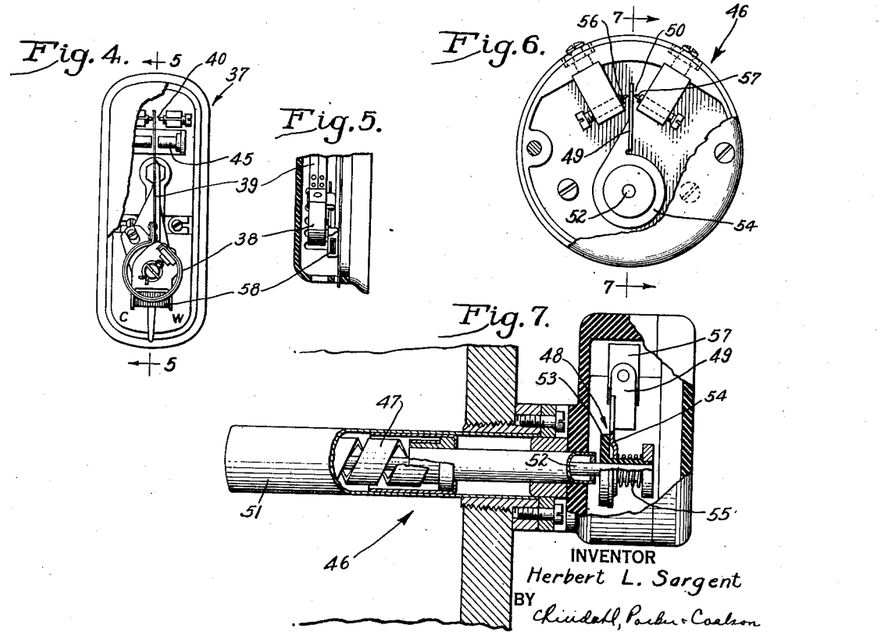
Fig. 4 is an elevational view of the room thermostat used in the system.
Fig. 5 is a fragmentary section taken along the line 5—5 of Fig. 4.
Fig. 6 is an elevational view of the switch mechanism of the thermostat shown in Fig. 7, part of the casing being broken away.
Fig. 7 is a sectional view of one form of auxiliary thermostat used in the control system, the section being taken along the line 7—7 of Fig. 6.

In order to produce the cyclic operation contemplated and delay the interruption of the heat supply until the lapse of a time interval following an increase in the rate of heat delivery to the space being heated, a timing mechanism is employed the operation of which is initiated by closure of the switch 50 of the thermostat 46. This timing mechanism, for reasons to appear later, preferably comprises a secondary source of heat operating in conjunction with a thermo-sensitive element which is influenced by temperature changes in the space being heated. In the present instance, the element 38 of the room thermostat performs this additional function, and the secondary heat source is formed by an electric resistance coil 58 which is disposed adjacent the element 38 as shown in Figs. 4 and 5. The electric heater is interposed in an independent circuit including a conductor 59 which extends from the source 34 of alternating current to the heater 58 and having the switch 50 interposed therein. The heater will thus be energized whenever the switch is closed. When thus positioned and controlled, the heater 58 operates as a result and after the lapse of a time interval following movement of the heat regulating device to heat-increasing position to accelerate the delivery of heat to the room thermostat.

Figure 3:
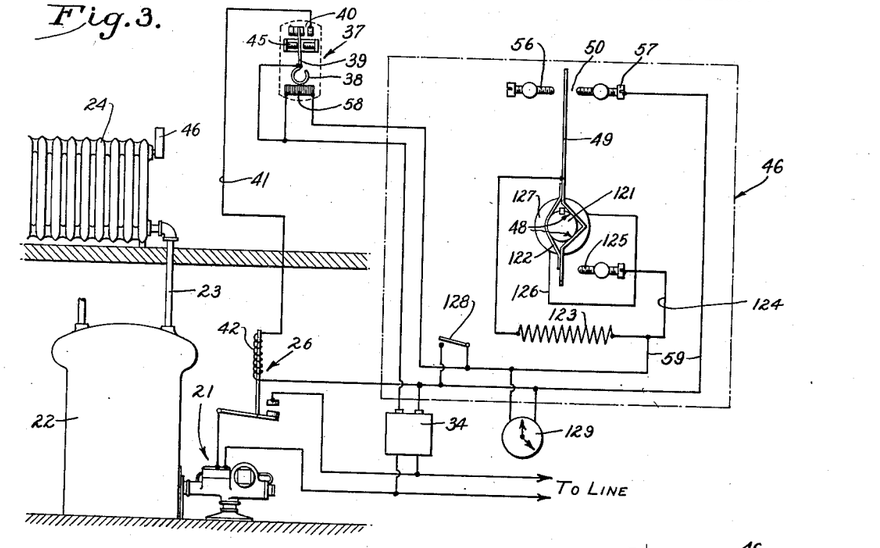
Fig. 3 is a schematic view and wiring diagram illustrating the use of the control for governing the operation of a system heated by an oil burner.

Since the invention contemplates movement of the regulating device to heat-decreasing position in timed relation to the actual delivery of heat to the space being heated or to the time when the heating mechanism becomes conditioned for delivery of heat at an increased rate following movement of the device to heat-increasing position, numerous variables inherent in the heating system may be avoided and more accurate timing obtained by locating the element 47 of the thermostat 46 at a point of control, the temperature of which changes approximately simultaneously with or in substantially fixed relation to changes in the rate at which the delivery of heat to the space is increased and decreased. Preferably, the thermostatic element 47 is arranged to respond to temperature changes of the heating mechanism at or near the point of transfer of heat to the space. For a steam heating system, the thermostat is preferably positioned to detect changes in the temperature of the metal forming the radiator, and for this purpose, may be mounted on or closely adjacent the radiator surface as shown in Fig. 2. Or in hot water heating systems, it may be disposed with its element 47 projecting into the radiator as shown in Fig. 3. In systems such as is shown in Fig. 1 wherein the circulation of heating fluid from the source of supply and to the room is more rapid, the thermostat 46 may, for the sake of appearance and convenience in installation, be located in one of the hot air pipes 17, it being apparent that the temperature in the pipe and that at the actual point of discharge of the heated air into the room will change substantially simultaneously. In some heating systems, the control will operate satisfactorily with the thermostat 46 located even closer to the primary source of heat than in the systems illustrated.

As used in the appended claims, the terms "temperature changes of the heating mechanism" and all equivalent expressions contemplate all of the locations above mentioned for the thermostatic element 47 and also are intended to include increases and decreases in temperature at any other point in or closely adjacent mechanism by which heat is developed or transferred to the space to be heated or heating fluid is conveyed from the primary source of supply to the point of delivery to the space.

For certain applications, it may be desirable to space the thermostatic switch 50 and the actuating means therefor a distance from the heating mechanism proper. For example, with a so-called unit heater, the room thermostat might be arranged to start and stop the blower motor in same as it controls the oil burner motor in Fig. 3, and the thermostat 46 would be disposed in the path of the heated air current but spaced from the radiator a distance such that its temperature would rise and fall in response to starting and stopping of the fan even though the radiator remains heated.

The capacity of the heater 58 required in order to produce proper timing of the heat-supplying cycles will vary with different types of thermostats. As a general rule, the heater should, when energized, be capable of heating the element 38 of the room thermostat through its operating range in an interval of approximately five minutes. With the thermostat shown arranged to have a temperature differential of two degrees, proper timing of the cycles will be obtained when the capacity of the heater 58 is such as to produce a false temperature of the thermostatic element approximately five degrees above that of the surrounding air. To facilitate adjustment of the heater capacity, a variable resistance 58ª may be interposed in the circuit 59 as shown in Fig. 1.

While for some types of heating systems it may be desirable to deenergize the electric heater sooner, for example, when the room thermostat ceases to call for heat or the regulating device returns to "off" position, such deenergization is effected in the present instance by opening of the switch 50 of the thermostat 46 in response to a fall of the temperature of the thermostatic element 47 resulting from movement of the heat regulating device to heat-decreasing position.

Figure 8:
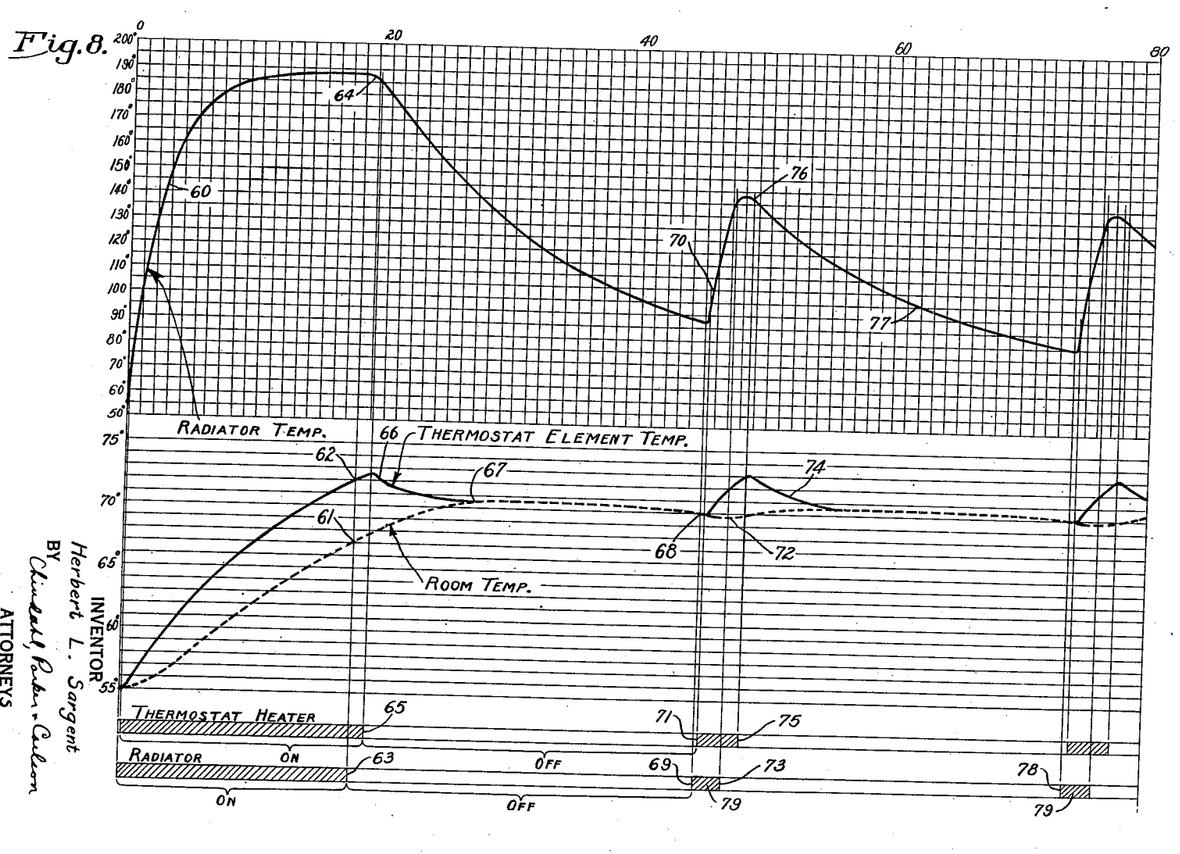
Figs. 8 and 9 are time charts illustrating the operation of the control system.

For the sake of convenience of illustration, the operation of the control will now be described with reference to the time charts of Figs. 8 and 9, which illustrate the operation of the control in conjunction with the heating system shown in Fig. 2. Let it be assumed that 70 degrees F. is the temperature desired to be maintained in the rooms and that the room thermostat has a differential of two degrees, the switch 40 being closed when the element 38 is at or below 70 degrees F. and the switch 43 being closed at or about 72 degrees F. Assuming that for some reason, such as a voluntary interruption of the steam supply during the night, the room has cooled to 55 degrees F, the room thermostat would be calling for heat with the switch 40 closed and the valve 18 in open position, and the switch 50 would be open due to previous cooling of the radiator to the room temperature.

When a supply of steam becomes available and steam flows into the radiator with which the auxiliary thermostat is associated, the radiator temperature will rise, and after a rise for example of five degrees, the switch 50 of the thermostat will close causing current to be applied to the electric heater 58. The element 38 of the room thermostat will be heated to a false temperature five degrees above that of the room, but owing to the low temperature of the latter, the false temperature will have no immediate effect. The temperature of the radiator thus continues to rise rapidly as indicated at 60 and may even approach that of the steam. The room temperature will increase at a more gradual rate. As the radiator temperature increases following closure of the thermostat switch 50, the switch arm 49 will be held against further movement, movement of the free end of the thermostatic element 46 being permitted by slippage in the friction coupling 48.

When the room has attained a temperature of 67 degrees as indicated at 61, the element 38 of the room thermostat will have been heated by the heater to 72 degrees F. as indicated at 62 whereupon the thermostat tongue will move to close the switch 43 thus completing the starting circuit 30 through the then closed switch 32. In the ensuing cycle of the motor operator, the valve 18 will be closed thus interrupting the further flow of steam to the radiators as indicated at 63. The radiator will continue at the same temperature for a brief interval as indicated at 64 during which the room thermostat will be maintained ineffectual and immediate initiation of another cycle prevented by the heater 58 which continues to remain energized until a two or three degree fall in the radiator temperature is detected by the auxiliary thermostat 46. Such a fall causes opening of the switch 50, the heater 58 being deenergized as indicated at 65 after which the temperatore of the thermostatic element 38 starts to fall as indicated at 66.

Whether or not another cycle will be initiated as soon as the thermostatic element 38 has cooled to room temperature depends on the value of the latter. First assuming that sufficient heat has been added in the cycle above described to heat the room above 70 degrees, then another cycle would not be initiated as the room thermostat reaches room temperature as indicated at 67. Thereafter, the heating system remains inactive while the radiator is cooling as shown by the curve and the room temperature is slowly decreasing. When a room temperature of 70 degrees is reached as indicated at 68, the switch 40 is closed and the valve 18 is again opened as indicated at 69. The radiator temperature increases immediately along the curve 70 thus energizing the heater 58 at the point 71. The effect of the addition of heat may not manifest itself immediately at the room thermostat; consequently, the temperature adjacent the latter may continue to fall to a value indicated at 72 following the admission of steam to the radiators. The temperature of the radiator will have been increased considerably by the time that a false thermostat temperature of 72 degrees has been attained at which time the thermostat switch 43 will be closed resulting in closing of the valve 18 as indicated at 73. If the heat added in this cycle is sufficient to raise the room above 70 degrees by the time the element 38 has cooled to room temperature along the curve 74 following deenergization of the radiator at 75 in response to the decrease at 76 in the radiator temperature, another cycle will not be repeated immediately. The room will then cool down as the radiator temperature falls along the curve 77, the succeeding heat-supplying cycle being initiated at 78 as the room temperature reaches 70 degrees.

Assuming that the rate of heat loss remains substantially constant, similar heat-supplying cycles of the control mechanism will thereafter be executed periodically, each cycle and the interval between successive cycles being determined by the prevailing rate of heat loss and the capacity of the electric heater. In each cycle, the radiator temperature will rise rapidly until the flow of steam has been interrupted, and after remaining constant for a brief interval, will decrease gradually. Thus, the radiator temperature alternately rises and falls whereby an average or mean temperature is established of a value such that the rate of heat delivery will approximately balance the prevailing rate of heat loss. Very close regulation is thus obtained. Moreover, each heat-supplying cycle is terminated and the amount of heat supplied during the same is limited independently of the prevailing room temperature. Heat is thus supplied in smaller amounts and more frequently with the present control than with controls of the type ordinarily used. As a result, the radiators are kept warm constantly, thereby avoiding reversal of the normal direction of air circulation in the room and the consequent feeling of chilliness often experienced when, with ordinary control systems, the room is at the proper temperature but the radiators are cold due to a prolonged period of inactivity of the heating mechanism occasioned by a previous overrun of the room temperature.

By operating the heating system in cycles as above described, the differential of the room thermostat is eliminated completely as a factor in determining the total temperature variation and this even though a detent device such as the magnet 45 may be used. Thus, it will be observed that while the initiation of each cycle is conditioned upon the existence of a room temperature below that desired to be maintained, the cycle is terminated by the production of a false temperature at the thermostat timed with respect to the delivery of heat to the space. In this way, the heat is turned off independently of the prevailing room temperature provided that the latter is sufficiently high to enable the necessary false temperature to be produced by the electric heater 58.

By virtue of the fact that the heater 58 is capable of heating the thermostat 37 only a few degrees above its control point, the particular type of timing mechanism used is advantageous in that the full heating capacity of the heating system may be attained whenever the room temperature is sufficiently below the control point of the room thermostat. Thus when the heating system is started up in the morning with the room temperature at a relatively low value, the timing device is maintained ineffectual until the room temperature approaches the desired value thereby allowing the radiator temperature to build up and the radiator to be utilized at maximum capacity. In this way, the room temperature may be raised to the desired value in a single cycle of the control mechanism even though the heating mechanism is, under normal conditions, shut off independently of the prevailing room temperature.

The effects of those characteristics of some heating systems which tend to cause overrunning or underrunning of the room temperature are overcome by delaying the termination of the heat-increasing cycles 79 until after the time when the heat actually begins to be delivered to the room, and by maintaining the room thermostat ineffectual until a subsequent decrease occurs in the rate of heat delivery. Thus, the usual sluggishness of a hot air furnace or the delay in the delivery of heating fluid to a room radiator following the call of the room thermostat for heat does not effect a shortening of the heating cycle defined by the timing mechanism, the operation of which is initiated by detection of a temperature rise by the auxiliary thermostat 46. Thereafter the heater must continue to supply heat for a substantial interval thereby insuring the delivery of a substantial amount of heat in each cycle regardless of the lag in the system. Moreover, it will be observed that the heating of the room thermostat continues for some time after interruption of the flow of heating fluid in response to a fall in the temperature of the heating system. In this way, the room thermostat is maintained ineffectual in so far as detection of a temperature below 70 degrees is concerned and therefore cannot initiate another cycle to turn on the heat supply until the allotted time has elapsed to allow the heat supplied in the previous cycle to become distributed throughout the room and influence the temperature of the air adjacent the thermostat.

Figure 9:
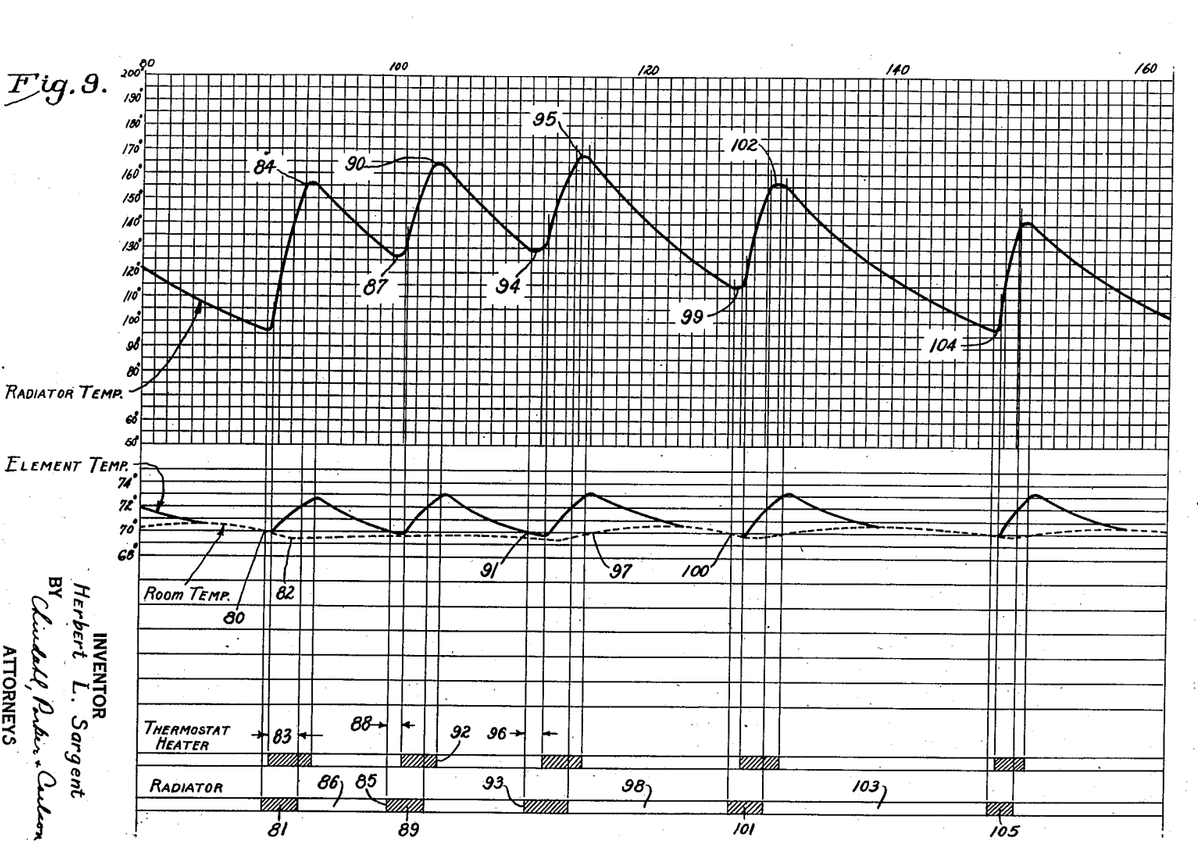

The manner of compensating for changes in the rate of heat loss is illustrated in Fig. 9. Let it first be assumed that the outside temperature has dropped suddenly so that the heat delivered at a previously established average radiator temperature of 115 degrees, for example, is insufficient to maintain the desired 70 degree room temperature. In the first ensuing cycle, which is initiated at 80 when the room temperature falls to 70 degrees, the duration of the heating interval 81 may be prolonged somewhat as compared to that of the previous cycle owing to the fact that the air temperature adjacent the room thermostat may, due to the increased heat loss, fall below 70 degrees, as indicated at 82, necessitating a longer period 83 of energization of the heater 58 before the added heat becomes effective to open the switch 40 of the room thermostat. As a result of this, a somewhat higher radiator temperature 84 will be attained.

Now, if the additional heat thus added in the cycle is not sufficient to compensate for the increasing heat loss, the room temperature adjacent the thermostat 37 will remain below 70 degrees, and as the thermostatic element cools to 70 degrees, another cycle will be initiated at 85 after a cooling interval 86.

Since this heating cycle starts with the radiator at a higher temperature 87 and losing heat more rapidly due to the increased rate of heat loss from the room, the interval 88 required to produce a temperature rise sufficient to close the switch 50 of the thermostat 46 and energize the heater 58, will be prolonged substantially. Accordingly, steam will be admitted to the radiator for a period 89 which is substantially longer than the heat-supplying periods at the previous lower rate of heat loss. In addition, the maximum radiator temperature 90 which is attained in this cycle will be somewhat above that attained in the previous cycle, although the total temperature rise may not be as great owing to the increased rate at which heat is given up by the radiator.

Assuming now that when the element of the room thermostat again cools to 70 degrees at 91 following deenergization of the heater 58 at 92, the room temperature is still below 70 degrees. In this case, the steam will again be turned on at 93 before the radiator has had an opportunity to cool down to the previous minimum 87. The heat supplying cycle thus starts with the radiator at a temperature as indicated at 94 and in this cycle, the radiator temperature will be built up to a still higher value 95 as a result of the prolonged interval 96 required in order to close the switch 50 of the thermostat 46.

Successive heat-supplying cycles will thus be executed until a room temperature of 70 degrees has been attained as indicated at 97 either due to the increased rate of heat supply to the space or a reduction in the loss therefrom. In such a succession of cycles, the radiator temperature will be built up in successive steps as above described, and in addition, the lengths of the radiator "on" periods will increase while the "off" periods are decreased in duration. As a result of the increased average radiator temperature and the increase in the proportion of the time during which steam is admitted to the radiator, the rate of heat delivery to the space being heated is increased, and such increase is in direct proportion to the change in heat loss.

Such automatic and accurate adjustment of the rate of heat delivery to compensate for an increased rate of heat loss is due to the novel manner of defining the heat-supplying cycles through the use of the thermostatic switch 50 which is arranged to control the electric heater 58 in response to increases and decreases in the rate of heat supply to the space being heated. By virtue of this arrangement, the lengths of the heating cycles are not constant, even at a fixed temperature of the room, but depend upon the temperature of the heating mechanism as well. Accordingly, the cycles may vary in lengths over wide ranges without any substantial changes in room temperature with the result that the system operates at a fixed control point to effect close regulation of the room temperature under all weather conditions that may occur through a heating season.

Building up of the radiator temperature in the manner above described is made possible with the present control by forcing an over-run of the radiator temperature so that the rise in radiator temperature required in order to turn off the heat supply may be greater than the fall in radiator temperature required in order to initiate the next cycle. In the form shown in Figs. 1, 2 and 3, such forcing of an over-run is produced by continuing the heat-supplying period until the lapse of a time interval following closure of the switch 50 so that the radiator temperature continues to rise. Thus, it will be observed that closure of the thermostat switch 50 does not turn off the heat but merely initiates the operation of a timing means, that is, the heater 58, through the medium of which the heat is eventually turned off. Then, when the steam is turned off, the radiator starts to cool from a temperature higher than that at which the switch 50 was closed, so that the next cycle may be initiated upon a decrease of a few degrees in the radiator temperature. In this way, the radiator temperature will build up automatically during a rapid succession of cycles.

It will be observed from the foregoing that the present control operates to adjust the lengths of the heating cycles so that under extreme conditions, the full capacity of the heating system may be utilized. Thus, if the heat loss increases to such a degree that a large number of heating cycles are executed in succession, the radiator temperature may be built up and approach the steam temperature. Under such conditions, each succeeding cycle will be of longer duration because it is initiated at a higher radiator temperature. Then when a cycle is initiated with the radiator at a temperature near the maximum steam temperature, an increase in the radiator temperature of sufficient magnitude to close the switch 50 of the thermostat 46 cannot be produced. As a result, the steam remains on continuously until the room temperature has been raised to 72 degrees which is not objectionable in weather so extreme as to produce such a condition of the control system.

Compensation for a decrease in heat loss from the building is effected automatically by a reduction in the average radiator temperature and by decreasing the length of the heat-supplying intervals. Assuming, for example, that the temperature outside of the building increases, the heat supplied available in the radiator at its high prevailing temperature will maintain the room above 70 degrees for a prolonged time interval 98 during which the radiator will be allowed to cool to a lower temperature 99 before the room thermostat again calls for heat as indicated at 100. Then, in the next heat-supplying cycle, the duration of the flow of steam indicated at 101 will be shortened somewhat due to starting of the cycle at the lower radiator temperature. The radiator will rise to a temperature 102 substantially lower than in the previous cycle. The heat supplied to the room will, in view of the decreased rate of loss, maintain the room above 70 degrees for a prolonged interval 103 during which the radiator temperature will fall to a still lower value 104 resulting in a further shortening of the next heat supplying period 105. In this way, the average radiator temperature is thus lowered, with the result that the rate of heat supply is decreased in proportion to the decrease in the rate of heat loss from the building.

Cycles of operation similar to those above described will be executed by the control mechanism when used in conjunction with other types of heating systems such as those illustrated in Figs. 1 and 3 wherein the present control has even greater utility owing to the greater delay in the delivery of heat from the primary source to the heating mechanism in response to movement of the regulating device to heat-increasing position. In such systems, compensation for changes in the rate of heat loss and correction for the detrimental lag factors is effected in the same general way although the shape of the temperature curves will vary somewhat owing to the different characteristics of the systems. For example, owing to the greater lag inherent in such systems, a substantially greater interval will ordinarily elapse between the call of the room thermostat for heat and the detection of the resultant temperature rise by the thermostat 46, operation of the timer 58 being thus delayed automatically until the actual delivery of heat to the room. Similarly, the temperature of the heating mechanism may continue to rise for a longer time after the room thermostat ceases to call for heat in response to the false temperature produced by the heater 58.

Figures 10, 11:
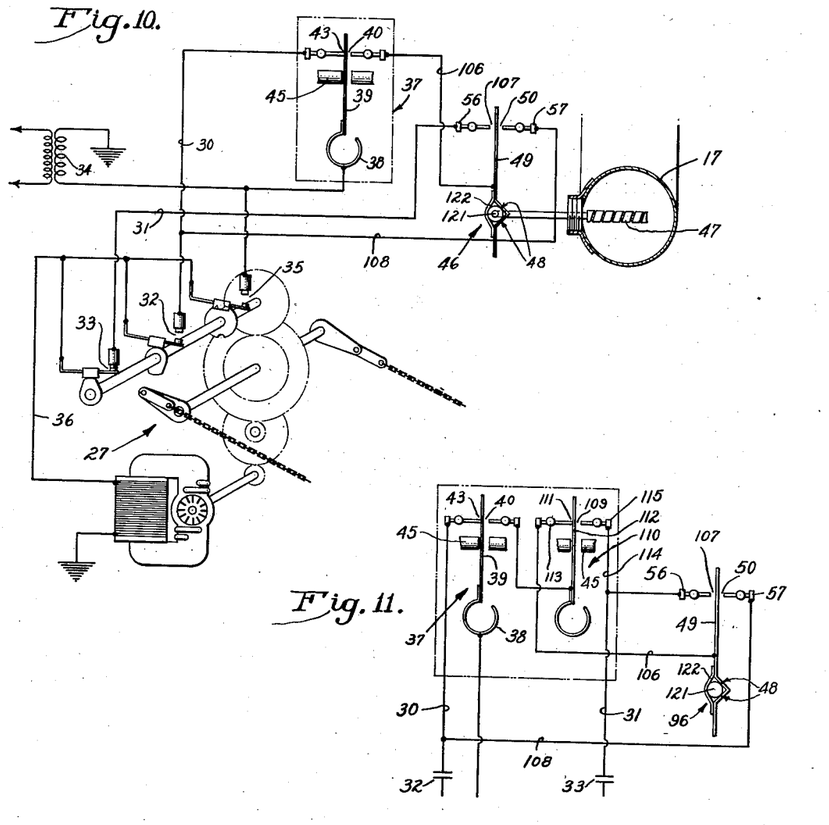
Figs. 10, 11 and 12 are schematic views and wiring diagrams showing modified forms of the control system.

Another method of utilizing the variable limit thermostat 46 is illustrated in Fig. 10 which shows the control elements for a heating system of the type shown in Fig. 1, the power operator 27 being arranged to execute draft opening and closing cycles in response to closure of the thermostat switches 40 and 43 respectively. As in the system shown in Fig. 1, the element 47 of the thermostat 46 is disposed within one of the hot air pipes 17, but is arranged to control the cycles of the operator 27 directly. To this end, the thermostat contact 40, instead of being connected directly to the switch 33, is connected to the switch through the medium of a conductor 106, the arm 49 of the thermostat 46, a switch 107 formed by the arm and the contact 56, and the conductor 31. The switch 50 of the thermostat 46 is connected in parallel with the room thermostat switch 43 by extending a conductor 108 from the conductor 30 to the contact 57.

With the parts thus arranged, it will be apparent that closure of the switch 40 when the room temperature falls below 70 degrees, for example, will complete a circuit through the switch 107 which is then closed due to a previous fall in temperature within the pipe 17. This circuit is through the then closed switch 33 and completion thereof initiates a cycle of the operator 27 to open the draft damper 15. When the thermostat 46 detects a rise in temperature within the pipe 17 as evidenced by closure of the switch 50, a shunt circuit for the motor operator around the thermostat switch 43 will be completed through the then closed switch 32. The operator then executes a cycle to close the damper 15 and thereby reduce the supply of heat to the room.

When the temperature within the pipe 17 has decreased sufficiently to close the switch 107, another damper opening cycle of the operator 27 will be executed provided the room temperature is still below 70 degrees as evidenced by closure of the switch 40. In the event that the heat supplied in the previous cycle of the control mechanism is sufficient to raise the room to a temperature sufficient to cause closure of the switch 43, the switch 40 will be open when the thermostat 46 attempts to initiate another draft opening cycle and the draft damper will be maintained closed. But, if the switch 40 is still closed when a fall in the temperature of the heating mechanism occurs as evidenced by closure of the switch 107, another draft opening cycle will be initiated immediately.

In systems where the thermostat 46 acts as last described, it is desirable to provide for maintaining the thermostat 46 ineffectual when the room temperature is substantially below the control point of the room thermostat. As shown in Fig. 11, this may be accomplished by utilizing an auxiliary thermostatic switch 109 to shunt the thermostat 46 out of control until the room temperature has been increased to within a few degrees of the value desired to be maintained. In this present instance, a separate thermostat 110 is used, being placed in the room preferably adjacent the thermostat 37 and set to maintain its switch 109 closed at temperatures below 67 degrees, for example, but to close its switch 111 at higher temperatures. Both of the thermostats are equipped with magnetic detents 45.

The switch 111 is interposed in the conductor 106 previously described by connecting the thermostat tongue 112 to the switch 40 and connecting the contact 113 to the contact arm 49. A conductor 114 joins the conductor 31 to the contact 115 so that when the switch 109 is closed, the conductor 31 is connected to the switch 40 so that the draft damper will be maintained in open position independently of the thermostat 46. Thus the thermostat 46 is maintained ineffectual, for example, during the heating up period when the heating system is turned on in the morning. But as soon as a room temperature of 67 degrees is attained, the switch 111 will be closed, and thereafter the control will operate in the manner above described in connection with the modification shown in Fig. 10.

Figure 12:
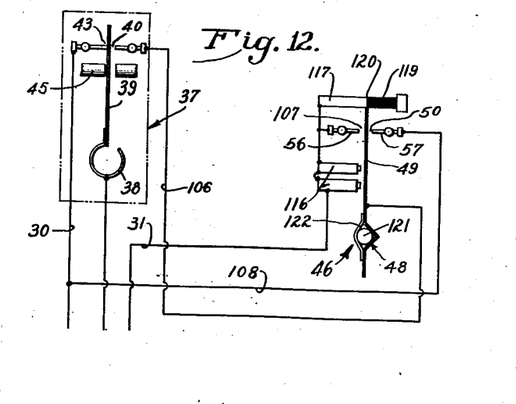

Fig. 12 illustrates one way of forcing an overrun of the radiator temperature when the thermostat 46 is used in the manner shown in Figs. 10 and 11. This is accomplished generally by providing for a larger differential of the thermostat 46 upon heating than upon cooling. In this form, an additional source of power, such as electromagnets 116 is provided for moving the control arm 46 against the stop 56 after a small movement of the arm away from the contact 57. The coils of the electromagnets are interposed in the conductor 31, the magnets being arranged to act on the arm 49 which constitutes the magnet armature.

Disposed above the end of the arm 49 for wiping engagement therewith is a bar comprising a conducting section 117 connected to the contact 56 and an insulated section 119 arranged at the end of the section 117. Provision is made for adjustment of the bar so that the junction of the conducting and insulating sections may be varied longitudinally of the gap between the switch contacts 56 and 57.

Assume, for example, that the contacts 56 and 57 are spaced apart a distance corresponding to a fifteen degree temperature rise at the thermostat 46 and that the insulating section 119 is positioned so that the tongue 49 will engage the conducting section 117 upon a fall in temperature of three degrees. When the room thermostat 37 calls for heat, closure of the switch 40 will complete a circuit for the draft operation through the switch 107 which will then be closed due to a previous cooling of the thermostat 46. As the thermostat 46 becomes heated, the tongue 49 moves toward the contact 57 engaging the latter after a fifteen degree rise. Closure of the switch 50 initiates a draft closing cycle after which the temperature surrounding the thermostat 46 begins to decrease. The arm 49 thus moves along the insulating section 119 and, after a temperature fall of three degrees, moves past the joint 120 onto the conducting section 117 whereupon a circuit is completed for the damper operator through the magnet windings and the switch 40 provided the room thermostat is still calling for heat. The operator is thus started to move the draft damper to open position, and the armature 49 is attracted by the magnets and drawn against the contact 56 so that a rise of fifteen degrees in the temperature of the heating mechanism will be required in order to again close the switch 50.

From the above, it will be observed that the arm 49 will be moved against the contact 56 in response to a smaller fall in temperature than the rise required in order to move the arm from the contact 56 to the contact 57. Thus, in the execution of a succession of heat-supplying cycles during the continuance of the room temperature below the control point, the temperature of the heating mechanism will be built up automatically thereby compensating automatically for an increase in the rate of heat loss causing such continued call for heat.

Referring now to Fig. 3, the variable limit thermostat 46 operating in conjunction with the room thermostat may be adapted to perform the functions of a boiler safety switch. To this end, the electric heater 58 is constructed to deliver the proper amount of heat when an auxiliary resistance element 123 is included in its circuit as shown. A branch conductor 124 connects one terminal of this element to a contact 125 which is carried by an arm 126 in position to swing into engagement with the lower end of the contact arm 49. The arm 126 is on a hub 127 fast on the shaft 121 which, as above described, oscillates back and forth with changes in the radiator temperature.

The contact 125 is so adjusted that it will move to the left as viewed in Fig. 3 upon an increase in temperature and will engage the arm 49 when the desired maximum limit temperature of the heating fluid has been attained. Closure of the switch thus formed short-circuits the resistance 123 thereby materially increasing the capacity of the heater 58 which quickly heats the room thermostat to a temperature such as to cause interruption of the burner operation.

Provision may also be made to utilize the heater 58 as a means for maintaining a lower room temperature at night or at other times when normal day temperatures need not be maintained. For this purpose, a manual operable switch 128 (Fig. 3) or a clock-operated switch 129 is arranged in parallel with the thermostat switch 50. When either of the switches 128 or 129 is closed, the switch 50 will be short-circuited and the heater 58 maintained energized continuously. By virtue of the false temperature produced adjacent the room thermostat, the latter will in effect operate to maintain a substantially lower room temperature although it is set for operation of its control switches at the normal value. By varying the capacity of the heater 58, any desired night temperature may be maintained.

This application is a continuation in part of my prior application Serial No. 665,692, filed April 12, 1933.

I claim as my invention:

1. In a heating system having a primary source of heat and means for conveying heat from said source to a remote point for delivery to a space to be heated, a regulator controlling the supply of heat from said source to said conveying means, a thermostat in said space controlling said regulator to increase thte heat supply when the space temperature is below a predetermined value, an electric heater associated with said thermostat for heating the same to a false temperature whereby to cause the supply of heat to be reduced under the control of said thermostat, a thermostatic element arranged to respond to the temperature of said conveying means at a point remote from said heat source, a second element having a limited range of movement and a driving connection with said first element such as to move to one limit position in response to a predetermined rise in temperature and to another position in the opposite direction in response to a subsequent predetermined fall in temperature irrespective of the temperature valve, and switch means operable upon movement of said second element into and out of said first position to energize and deenergize said heater.

2. In a heating system having a heating mechanism for transferring heat to a space to be heated, the combination of two independent thermostatic switches one responsive to temperature changes in said space, the other being arranged to detect rises and falls in the temperature of said mechanism, an electric heater controlled by the latter thermostat and operating in response to the detection of the initial temperature rise to thereafter actuate said first mentioned switch independently of the prevailing space temperature, and a device responsive to actuation of the first mentioned switch by said electric heater to interrupt the supply of heat to said mechanism.

3. In a heating system, means for transferring the heat to a space to be heated, means regulating the supply of heat by said transfer means, a thermostat in said space responsive to the transferred heat and governing the operation of said regulating means, a secondary source of heat for heating said thermostat, and a secondary thermostat controlling the operation of said secondary heat source in response to temperature changes at a predetermined control point the temperature of which varies substantially in accordance with variations in the rate of delivery of heat by said system.

4. In a heating system having means for transferring heat from a primary source to a space to be heated, the combination of a regulator controlling the rate of delivery of heat to said space, a thermostat in said space having a control member movable between heat-increasing and heat-decreasing positions to control said regulator, an electric heater operatively associated with said thermostat and adapted when energized to a predetermined degree to cause movement of said control member to heat-decreasing position, said heater operating when the degree of energization is reduced to cause movement of said member to a position determined by the temperature prevailing in said space, a thermostatic element arranged to detect increases and decreases in the rate of delivery of heat to said space, and means operating to increase and decrease the energization of said heater in response to such increases and decreases respectively.

5. In a heating system having mechanism for delivering heat to the space to be heated, the combination of a regulating device movable between heat-increasing and heat-decreasing positions to regulate the delivery of heat by said mechanism, a thermostat controlling said device and operating to cause movement thereof to heat-increasing position in response to a fall in the space temperature below a predetermined value, timing mechanism operable after the lapse of a time interval to cause movement of said device to heat-decreasing position irrespective of the temperature in said space, a thermostatic element responsive to the temperature of said heating mechanism, a slip drive connection having a driving member actuated by said element and a driven member having a limited range of movement, and means actuated by movement of said driven member in response to a rise in the temperature of said heating mechanism to initiate operation of said timing mechanism.

6. In a heating system having a heating mechanism for transferring heat to a space to be heated and a source of heat supply for said mechanism, the combination of timing mechanism adapted when set in operation to interrupt the supply of heat from said source to said mechanism after the lapse of a time interval, and means responsive to the initial rise in the temperature of said heating mechanism to initiate operation of said timing mechanism.

7. In a heating system having mechanism for transferring heat to a space to be heated, the combination of a device for regulating the supply of heat to said mechanism, and means controlling said device to maintain a uniform temperature in said space under varying rates of heat loss therefrom comprising a thermostat arranged to detect a fall in the temperature of said space below a predetermined value, a second thermostat responsive to temperature changes of said mechanism, and a timer controlled by said second thermostat and controlling said device to cause the supply of heat to said mechanism to be decreased irrespective of the space temperature, said thermostats and timer cooperating during the continuance of the space temperature below the value to be maintained therein to cause intermittent increases and intervening decreases of lesser magnitude in the temperature of said mechanism whereby to build up the average temperature of said mechanism to a value corresponding to the prevailing rate of heat loss from said space.

8. In a system for maintaining a region at a predetermined temperature, the combination with means for conducting a temperature-changing medium to said region and means for controlling the temperature of said medium including a thermostat responsive to the temperature of said region, of heating means for influencing the action of said thermostat, and means responsive to the temperature of said medium and governing the operation of said heating means.

9. In combination with mechanism for supplying heat for delivery to a medium to be heated, a thermostat responsive to temperature changes in said medium to initiate operation of said mechanism, and means for terminating the operation of the mechanism while said thermostat continues to call for heat including an auxiliary thermostat responsive to changes in temperature at a point adjacent that of delivery of heat to said medium by said mechanism and operable to detect a temperature rise of predetermined magnitude at said point resulting from operation of said mechanism irrespective of the temperature value existing at said point when operation is initiated by said first mentioned thermostat.

10. In a heating system, means providing a source of heat, means for transferring the heat from said source to a medium to be heated, a thermostat arranged to detect variations in temperature of said medium relative to a predetermined value, a device controlled by said thermostat for regulating the supply of heat to said transfer means, independent thermostatic means adapted to detect rises and falls in the temperature of said transfer means, and means controlled by said last mentioned thermostatic means and influencing said first mentioned thermostatic means to determine the time of control of said device thereby.

11. In a heating system, the combination of a heating radiator arranged to deliver heat to a medium to be heated, a device regulating the supply of heat to said radiator, means including a thermostat operating in response to a fall in the space temperature below a predetermined value to increase the supply of heat to said radiator, and subsequently acting means for interrupting the heat supply independently of the prevailing space temperature including an auxiliary thermostat responsive to the temperature of the radiator surface and arranged to detect a rise of predetermined magnitude in such temperature resulting from the increase in the heat supply to the radiator.

12. In a heating system, the combination with means for transferring heat to a medium to be heated of a device governing the supply of heat to said transfer means, a thermostat controlling said device to cause the supply of heat to be increased and decreased respectively when the temperature of said medium falls below and rises above a predetermined range, an auxiliary thermostat operating after the heat has been turned on to detect a rise of a predetermined magnitude in the temperature of said transfer means and acting in response to such rise to turn off the heat supply independently of the condition of said first mentioned thermostat, said auxiliary thermostat acting to detect a subsequent fall in temperature smaller in magnitude than said temperature rise and in response to such fall to cause the supply of heat to again be turned on providing said first mentioned thermostat is still calling for heat.

13. In a heating system, the combination with means for transversing heat to a medium to be heated of a device governing the supply of heat to said transfer means, a thermostat controlling said device to cause the supply of heat to be increased and decreased respectively when the temperature of said medium falls below and rises above a predetermined range, an auxiliary thermostat arranged to detect alternate rises and falls in the temperature of said transfer means and acting in response to a rise in such temperature to turn off the heat supply independently of said first mentioned thermostat, said auxiliary thermostat operating in response to a subsequent fall in temperature to permit the supply of heat to be turned on under the control of said first mentioned thermostat.

14. For use with a space heating system having a primary source of heat and a device for regulating the transfer of heat from the source to the space to be heated, the method of control which comprises moving said device to heat-increasing position when the temperature in said space is below a predetermined value, and moving the device to heat-decreasing position after the lapse of a predetermined time interval measured from the time when heat begins to be delivered to the space at an increased rate.

15. For use with a heating system having mechanism for delivering heat to a space to be heated, the method of control which comprises intermittently increasing the temperature of said mechanism during a prolonged continuance of the space temperature below the value desired to be maintained, and after each temperature rise decreasing the temperature of the mechanism through a range less than the previous temperature rise.

16. In a heating system having mechanism for delivering heat to a space to be heated, the combination with a regulator controlling said mechanism to increase and decrease the delivery of heat to said space, a thermostat in said space, a thermostatic element responsive to temperature changes at a predetermined point the temperature of which is proportional to the prevailing rate of heat delivery by said mechanism, and means operated by said element and operating in conjunction with said thermostat during the continuance of the space temperature below a predetermined value to control said regulator and cause intermittent increases and alternate decreases of lesser magnitude in the temperature at said predetermined point.

17. The method of controlling the supply of temperature changing medium to a temperature changer arranged in heat-exchanging relation to a space the temperature of which is to be controlled, said method comprising alternately initiating and interrupting the flow of said medium to said temperature changer in response to deviation of the space temperature in one direction from a predetermined value to be maintained, and terminating the supply period irrespective of the prevailing space temperature and after the lapse of a time interval following a predetermined change in the temperature of said temperature changer resulting from initiation of the supply of medium thereto.

18. The method of controlling the supply of temperature changing medium to a temperature changer arranged in heat-exchanging relation to a space the temperature of which is to be controlled, said method comprising alternately initiating and interrupting the flow of said medium to said temperature changer in response to deviation of the space temperature in one direction from a predetermined value to be maintained, and normally terminating the supply period irrespective of the prevailing space temperature and in response to the initial change in the temperature of said temperature changer resulting from the supply of medium thereto.

19. In a heating system having apparatus for supplying heat to a space to be heated, a regulating device controlling the delivery of heat by said heater and movable between heat-increasing and heat-decreasing positions, two thermostats having independently operable thermostatic members, one of the thermostats being arranged to detect variations in the space temperature relative to a value to be maintained therein and the second thermostat being arranged to detect predetermined rises and falls in the temperature of said apparatus irrespective of the value thereof, and means controlled by said thermostats and operating to cause movement of said device to heat-increasing position in response to a fall in the space temperature below said value and to cause movement of the device to heat-decreasing position immediately upon detection of a resulting rise in the temperature of said apparatus by said other thermostat.

20. In a heating system having heating apparatus for supplying heat to a space to be heated, the combination of a regulating device movable to heat-increasing and heat-decreasing positions to control the supply of heat by said apparatus, a thermostat controlling said device to cause movement thereof to heat-increasing position in response to a fall in the space temperature below a predetermined value, a thermostatically actuated element movable in opposite directions as the temperature of said apparatus rises and falls, a driven member having a driving connection with said element such that the member moves with the element through a limited range in response to alternate rises and falls in the temperature of said element irrespective of the magnitude of such rises and falls beyond said range, and means operating as an incident to movement of said member through said range following movement of the device to heat-increasing position in response to a call of said thermostat for heat to cause movement of said device to heat-decreasing position.

21. The combination with heat-modifying means for affecting the temperature within a chamber, a thermostat located without the field of direct thermal influence of the heat-modifying means but subject to variations of the chamber temperature, and means controlled by the thermostat whereby the heat-modifying means may be rendered less effective as the chamber temperature is caused to pass through a predetermined temperature in one direction and more effective as the chamber temperature is permitted to pass through a predetermined temperature in the opposite direction, of means for automatically effecting adjustments of the thermostat comprising controlling means closely associated with the heat-modifying means and directly responsive to its temperature-influencing condition and means connected with and responsive to said controlling means but closely associated with said thermostat whereby a change in the effectiveness of the heat-modifying means due to an operation of the thermostat as the chamber temperature is varying in one direction will so adjust the thermostat as to cause it to vary the effectiveness of the heat-modifying means in the opposite sense as the chamber temperature varies in the opposite direction before the predetermined temperature is reached at which the thermostat would effect such a change without the cooperation of the adjusting means, said automatic thermostat adjusting means including a driving element connected with the controlling means associated with the heat-modifying means, a driven element upon the movements of which the adjustments of the thermostat are dependent, a friction joint between said driving and driven elements, and means for limiting the amplitude of movement of the driven element whereby the driving element may first move the driven element to the extent permitted by the amplitude limiting means to effect an adjustment of the thermostat and thereafter move idly against the opposing resistance of the friction joint so as to be conditioned to immediately commence to shift the driven element in the opposite direction when the return movement of the driving element is initiated.

22. In a system having apparatus arranged in temperature changing relation to a space to be conditioned, the combination of a regulating device movable to temperature-increasing and temperature-decreasing positions to control the transfer of heat between said apparatus and space, a thermostatic element closely adjacent said apparatus so as to be directly responsive to and to follow all temperature changes thereof and move in opposite directions with opposite temperature changes, a clutch having a driving member actuated by said element and a driven member movable through a limited range, a switch actuated by said member and opened and closed by movement of the member in opposite directions through said range, and means responsive to a change in the condition of said switch following movement of said regulating device to one of said positions to cause movement of the device to the other position.

23. In combination with a heating system having a device movable between heat-increasing and heat-decreasing positions to regulate the supply of heat to the space to be heated, thermostatic means operating to cause movement of said device to heat-increasing position in response to a fall in the space temperature below a predetermined value, an electric heater energized after the lapse of a substantial time interval following movement of said device to heat-increasing position and in response to the resulting delivery of heat to said space at a point remote from said thermostatic means, said heater acting, when energized, to raise the temperature of the thermostatic means to a false value.

24. In a temperature control system, the combination of temperature changing means for a space, means responsive to the temperature of the space for controlling said temperature changing means, auxiliary heating means for said temperature responsive means, and means responsive to changes in the condition of the temperature-changing means irrespective of the value of the condition for controlling the operation of said auxiliary heating means.

25. In a condition changing system having apparatus for receiving energy from a source of supply and transferring the same to a body to be conditioned, the combination of a regulating device movable to condition-increasing and condition-decreasing positions to control the supply of energy to said apparatus, means responsive to a deviation of the condition of said body from a desired value at a definite location in the body to move said device to one of said positions, a device associated with said apparatus and arranged to detect changes in the rate of transfer of energy from said apparatus to said body irrespective of the value of such rate, and means controlled by said device as a result of a predetermined change in the said rate of transfer following movement of said device to said first mentioned position to cause movement of the device to said other position prior to the time when the changed rate of energy transfer becomes effective at said location.

26. In combination, a condition-changing apparatus for regulating a condition to be controlled and capable of storing energy, a condition responsive means in control of said apparatus, a device continuously responsive to the value of the energy stored in said apparatus to closely follow reverse changes in such value, and means controlled by said device as a result of a predetermined change in the value of said stored energy but irrespective of the absolute value thereof and operable to change the condition of said apparatus in a manner to produce a reverse change in the stored energy.

27. The method of controlling a condition-changing system having a source of energy and a device movable between condition-increasing and condition-decreasing positions to regulate the transfer of energy from said source to a body to be conditioned, said method comprising moving said device to one position when the condition at a point of control in said body deviates from a predetermined value, and moving the device to the other position after the lapse of a time interval measured from the initial change in the rate of energy transfer resulting from movement of said device to said first mentioned position.

28. The method of controlling the movements of a regulating device between condition-increasing and condition-decreasing positions to govern the supply of energy to an apparatus from which energy is transferred to a body to be conditioned, said method comprising moving said device to one of said positions when the condition at a point of control in said body deviates in one direction from a predetermined value, and moving the device to the other position in response to a predetermined resulting change in the value of the energy supplied to said apparatus but irrespective of the absolute value thereof.

29. Apparatus for controlling a heating system to maintain the temperature in a space to be heated substantially at a predetermined value comprising, in combination, regulating means by which the supply of heat from said system to said space may be increased and decreased, mechanism controlling said regulating means to cause heat to be supplied to said space intermittently in cycles terminated independently of the prevailing temperature in said space, and thermostatic means set to respond to a predetermined temperature somewhat below said predetermined value and operating to render said cyclic control mechanism ineffectual at space temperatures below said predetermined temperature and thereby permit heat to be supplied to said space at the full capacity of the heating system until said predetermined temperature has been attained.

HERBERT L. SARGENT.